May 19, 1964     P. J. MAZZIOTTI     3,133,432

TELESCOPING UNIVERSAL JOINT

Filed May 7, 1962

United States Patent Office 3,133,432
Patented May 19, 1964

3,133,432
TELESCOPING UNIVERSAL JOINT
Philip J. Mazziotti, Toledo, Ohio, assignor to Dana Corporation, Toledo, Ohio, a corporation of Virginia
Filed May 7, 1962, Ser. No. 192,915
11 Claims. (Cl. 64—21)

This invention relates to universal joints in general and more specifically to constant velocity universal joints of the ball type in which the torque transferring members are relatively movable in an axial direction.

It is a well recognized fact that cross pin type universal joints, which were originated early in the art, when operating at an angle will distort the steady uniform rotation of the driving shaft to an irregular jerky rotation of the driven shaft. This distortion is not due to mechanical imperfection, but is due to the faulty mechanical principle of this type of joint.

The greater angles of operation and speed of rotation of present day joint applications have resulted in increased demands for workable and inexpensive constant velocity universal joints to overcome this irregular rotation. Constant velocity universal joints in themselves are old in the art and were primarily evolved to overcome deficiencies in the performance of the cross pin type joint. It is well known to those skilled in the art that in order to provide constant rotational velocity between members disposed at an angle to one another, it is sufficient to provide an intermediate revolvable member between the driving and driven members bisecting the angle between the axes of these members. Ball type constant velocity joints provide such an intermediate revolvable means to satisfy this requirement.

This invention relates to yet another problem pertaining to universal joint applications. When the angle between the axes of the driving and driven members changes thereby resulting in axial displacement or when the driving means and driven means vary in their relative axial displacement for other reasons, the coupling therebetween must provide means to accommodate this variation in length. The prior art couplings usually accommodate such variation in a slip arrangement separate from the universal joint, such as a telescoping splined stub shaft and a sleeve yoke assembly. However, this assembly by its very nature has a high degree of friction which resists such variation when under a torque load. Another disadvantage is the plurality of parts involved, since the telescoping joint and universal joint are two separate structures.

Some prior art constant velocity universal joints have incorporated means within the joint itself to accommodate relative axial movement or telescoping. A problem involved in these joints is maintaining the components of a close enough dimensional tolerance to produce an operative structure.

Therefore, it is an object of this invention to provide a constant velocity universal joint which in itself will accommodate both the relative angular and axial displacement between the driving and driven means and in which dimensional tolerances need not be held to a minimum for proper performance.

Another object of this invention is to provide such a constant velocity universal joint in which relative angular and axial displacement is accomplished with a very small amount of frictional resistance and with a balance of axial forces.

Yet another object of this invention is to provide such a universal joint which has improved means for positioning the torque transferring means of the universal joint.

It is a still further object of this invention to provide such a universal joint which is simple to construct, easy to assemble, and yet inexpensive and durable.

Other and further objects of this invention will become apparent from the following detailed description taken in conjunction with the accompanying drawings in which.

Figure 1:
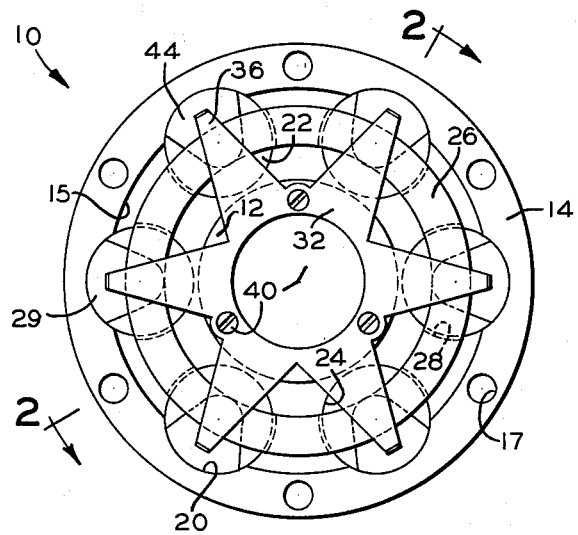
FIG. 1 is an end elevational view of a constant velocity ball type universal joint embodying this invention.
Figure 2:
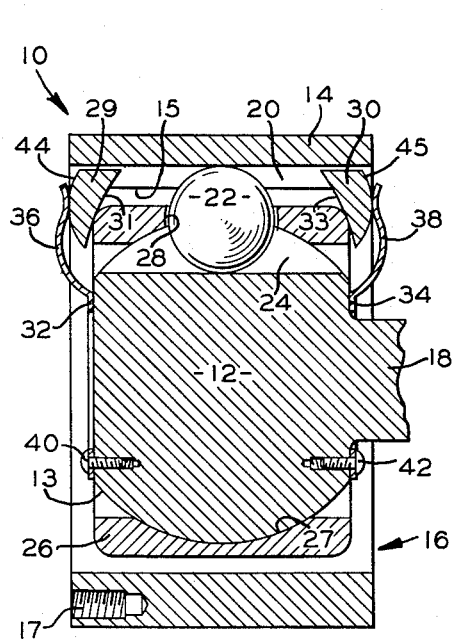
FIG. 2 is a cross sectional view of the universal joint taken along the lines 2—2 of FIG. 1.

Referring now to the drawings and more particularly to FIGS. 1 and 2, the universal joint shown generally at 10 includes an inner race 12 and an outer race 14. The outer race 14 is annular in form thereby providing a cylindrical axial opening shown generally at 16 wherein the inner race 12 is disposed for axial and angular movement. The race 14 may be attached to a member of a drive line in a suitable manner as by bolting the same to threaded openings 17 in the race 14. The inner race 12 presents a truncated spherical surface 13 and is prepared as an integral enlarged portion of the shaft 18; however, the shaft and race may be formed separately and securely connected. Either the race 12 or the race 14 may function as the driving member while the other functions as the driven member.

A plurality of circumferentially spaced axially straight grooves 20 are provided in the inner surface 15 of the outer race 14 with each groove adapted to receive a torque transmitting means in the form of a drive ball 22. The inner race 12 is also provided with a plurality of axially extending grooves 24 which are disposed in cooperating registration with the grooves 20 in the outer race 14 and adapted to receive a drive ball 22. The drive balls 22 transmit torque between the races 12 and 14 and also serve as the intermediate revolvable member. An annular cage 26 surrounds the inner race 12 and has the inner surface 27 thereof prepared to conform to the outer surface 13 of the inner race 12 and slidingly engage the same, while being spaced from the outer race 14. It is therefore apparent that the cage 26, while engaging the inner race 12, is freely rotatable relative thereto and since it is spaced from the outer race 14 is freely movable relative thereto. The cage 26 is provided with a plurality of circumferentially spaced openings 28, with each opening adapted to receive one of the drive balls 22 and prepared to closely conform thereto. The openings 28 are in uniplanar relationship and thus maintain the balls 22 in a single plane.

Means are provided to position the cage 26 containing the balls 22 in a plane which constantly bisects the angle defined by the axes of the inner and outer races 12 and 14 so that the balls may function as the intermediate revolvable member. More particularly, a plurality of cam members 29 and 30 are provided to position the cage 26. A pair of cam members 29 and 30 are positioned in each groove 20 in the outer race 14 with one cam from each pair on either axial side of the cage 26. The portions 31 and 33 of the cams 29 and 30 respectively which engage the cage 26 are prepared as double curved, concave surfaces, while the surfaces of the cage 26 which engage the portions 31 and 33 as cam followers are of arcuate configuration to reduce friction. The radially outer portion of the cams 29 and 30 conform to and are slidably received in the grooves 20 of the outer race 14.

Means are provided to position the cams 29 and 30 against the cage 26 so that the curved surfaces 31 and 33 of the cams may properly position the cage. More particularly, a pair of springs 32 and 34 are carried by the inner race 12 and are provided with a plurality of leaf spring segments 36 and 38 respectively. The spring 32 is fixedly secured to the outer end of the inner race 12 in a suitable manner as by a plurality of screws 40, while the spring 34 is suitably secured to the inner end of the inner race 12 by means of a plurality of screws 42. Each leaf spring segment 36 of the spring 32 engages an arcuate portion 44 of the cams 29 while each leaf spring segment 38 of the spring 34 engages an arcuate portion 45 of the cams 30. In this manner, the cams 29 and 30 are constantly biased against the cage 26 and thereby adapted to position the same relative to the inner and outer races 12 and 14. The surfaces 44 and 45 need not be prepared arcuately, however, such configuration proves most satisfactory, for upon angular displacement of the races 12 and 14, it results in less deflection of the leaf spring segments 36 and 38.

Upon relative axial movement between the inner and outer races 12 and 14, the cams 29 and 30 and the balls 22 slide within the grooves 20 of the outer race 14. Since the cage 26 and inner race 12 are spaced from the outer race 14 and the springs 32 and 34 are carried by the inner member, there is no structure to interfere with the telescoping movement and such movement does not deflect the springs. Upon relative angular movement between the inner and outer races 12 and 14, the cage 26 moves against the double curve concaved surfaces 31 and 33 of the spring biased cams 29 and 30 and is positioned thereby in the plane bisecting the angle defined by the inner and outer races 12 and 14 thereby positioning the drive balls 22 in the bisecting plane for satisfactory constant velocity transmission of rotary motion between the races. Angular movement causes the cams 29 and 30 to be urged apart by the cage 26, however, the springs 32 and 34 will deflect thereby allowing such movement while still maintaining their biasing effect.

Figure 3:
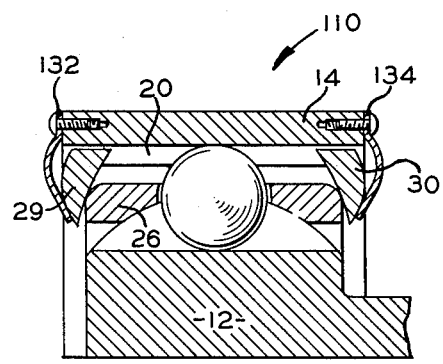
FIG. 3 is a view according to FIG. 2 of a portion of another embodiment of this invention.

Referring now to FIG. 3, a universal joint 110, which is a slight variation of the embodiment of FIGS. 1 and 2, is shown. The relationship and configuration of the inner and outer races 12 and 14 of the universal joint 110 remain the same as previously discussed with regard to the joint 10. The cage 26 conforms to the inner race 12 and is spaced from the outer race 14; the cams 29 and 30 are slidably carried in the grooves 20 in the outer race 14 and positionably engage the cage 26. A pair of springs 132 and 134 are attached to and carried by the outer race 14 instead of as in universal joint 10 wherein the springs are carried by the inner race 12. In this embodiment, the inner race 12, cage 26, cams 29 and 30, and drive balls 22 telescope as a unit relative to the outer race 14, and in so telescoping flex the springs 132 and 134 as well as flexing the same when moving angularly. For this reason, the embodiment of FIGS. 1 and 2 is more desirable than this embodiment of FIG. 3.

Figure 4:
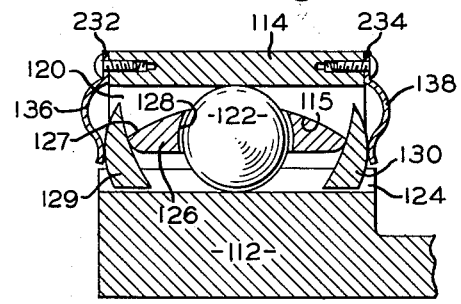
FIG. 4 is a view according to FIG. 2 showing a portion of yet another embodiment of this invention.

In FIG. 4, another embodiment of this invention is shown including relatively movable inner and outer races 112 and 114. The annular outer race 114 is provided with an axially extending opening 115 having a spherical configuration. An annular cage 126 is spaced from and surrounds the inner race 112 while the outer surface 127 thereof is prepared to conform to the inner surface 115 of the outer race 114 and slidingly engages the same. It is, therefore, apparent that the cage 126, while engaging the outer race 114 is freely rotatable relative thereto while being axially movable unitarily therewith, and since it is spaced from the inner race 112 is freely movable relative thereto.

The inner and outer races 112 and 114 are provided with registering circumferentially spaced axially extending grooves 124 and 120 respectively, which grooves are adapted to receive torque transferring means in the form of drive balls 122. The cage 126 is provided with a plurality of circumferentially spaced, uniplanar openings 128, with each opening adapted to receive one of the drive balls 122 and prepared to closely conform thereto and thus maintain the same in a single plane.

As in the embodiments of FIGS. 1–3, a plurality of cam members 129 and 130 are provided to position the cage 126. A pair of cams 129 and 130 are positioned in each groove 124 in the inner race 112 with one cam from each pair on either axial side of the cage 126 and configured so as to position the cage as previously described. The radially inner portion of the cams 129 and 130 conform to and are slidably received in the grooves 124 in the inner race 112.

A pair of springs 232 and 234 are suitably secured to opposite ends of the outer race 114 with each having a plurality of leaf spring segments 136 and 138 engaging the cams 129 and 130 respectively and constantly biasing the same into positioning engagement with the cage 126. In this embodiment, the outer race 114, cage 126, drive balls 122, cams 129 and 130, and springs 232 and 234 telescope as a unit relative to the inner race 112. During the telescoping movement, no deflection is induced in the springs 232 and 234, while upon relative angular movement between the members, the cams 129 and 130 move apart and deflect the springs 232 and 234 while being biased thereby.

The springs 232 and 234 of the embodiment of FIG. 4 can be reversed in position as previously described regarding FIGS. 1 and 2 and thereby carried by the inner race 112 instead of the outer race 114. In such an embodiment, the springs 232 and 234 will be flexed by both telescoping and angular displacement and for this reason the embodiment of FIG. 4 is more desirable.

It should be noted that the above embodiments operate satisfactorily at both large and small angles and are especially desirable at relatively large angles. When operating at an angle, the grooves in the inner and outer races which lie out of the plane of th angular deflection assume a crossed or intersecting relationship while the grooves within the plane of angular deflection assume a converging-diverging relationship. With such a relationship, the converging grooves subject the drive balls contained therein to coupling forces in the form of an axial urging load tending to force the balls axially out of the diverging ends of the grooves. By maintaining all the drive balls within the cage, the cage absorbs these coupling loads and imposes the same on the springs which are positioning the cage. The springs therefore, must have sufficient biasing effect to overcome these loads. A great advantage of the spring biased cams become apparent when operating at an angle, for when the inner and outer races are displaced angularly, the position of the groove intersections will dictate the bisecting position of the drive balls, whereas when races are substantially aligned the spring loaded cam means will position the drive balls through the cage as desired. Therefore, if the cams were stationary, any dimensional errors in the components of the assembly, while not being appreciably detrimental when the races are substantially aligned, would inhibit the drive balls from assuming the position dictated by the intersecting grooves upon angular displacement. By spring biasing the cams, these dimensional errors can be compensated for by deflection of the spring means so that the groove intersections can position the drive balls in the proper bisecting plane.

As shown and described, all the embodiments have a pair of cage positioning cams in each groove of one of the races, however, it should be understood that a pair of cams are not necessary for each groove as long as at least three pairs of cams are used and as long as the cams are disposed so that the positioning forces on the cage are circumferentially balanced.

From the foregoing it is apparent that a constant velocity universal joint has been described which in itself will accommodate both angular and axial relative displacement between the driving and driven means; wherein the dimensional tolerance need not be held to a minimum for proper performance; wherein relative angular and axial displacement is accomplished with a very small amount of frictional resistance and with a balance of forces; wherein improved means have been provided for positioning the torque transferring means of the universal joint in the proper bisecting plane; and which is simple to construct, easy to assemble and yet inexpensive and durable.

While several embodiments of this invention have been shown and described, it is apparent that there may be many changes in the structure as well as operation thereof without departing from the scope of the appended claims.

What is claimed is:

1. The combination with a constant velocity universal joint including a pair of angularly and axially movable members, a plurality of means for transmitting torque between said members and means for maintaining said torque transmitting means in a uniplanar relationship, of a plurality of cam means positionably engaging said maintaining means and being independently movable relative thereto and to said members and to each other, and resilient means biasing said cam means into engagement with said maintaining means whereby said torque transmitting means functions as the intermediate revolvable member of the joint.

2. The combination defined in claim 1 wherein said plurality of cam means are disposed in paired relationship and the cam means of each pair of cam means are disposed in spaced relationship and positionably engage opposite sides of said maintaining means.

3. The combination defined in claim 2 wherein said cam means are carried by one of said members for angular movement unitarily therewith and axial movement relative thereto and are both angularly and axially movable relative to the other of said members.

4. The combination with a constant velocity universal joint including a pair of angularly and axially movable members having cooperating grooves therein, a plurality of torque transmitting means disposed in said grooves for transmitting torque between said members and means for maintaining said torque transmitting means in a uniplanar relationship, of a plurality of cam means slidably disposed in at least some of said grooves and movably engaging said maintaining means, and spring means biasing said cam means into engagement with said maintaining means.

5. The combination defined in claim 4 wherein said spring means biases each of said cam means independently of the other of said cam means.

6. The combination with a constant velocity universal joint including a pair of angularly and axially movable members having cooperating grooves therein, a plurality of torque transferring means disposed in said grooves and adapted to transmit torque between said members, and means for maintaining said torque transferring means in uniplanar relationship, of a plurality of pairs of cam means disposed in spaced relationship and positionably engaging opposite axial sides of said maintaining means, said cam means being movable relative to each other, said maintaining means and said members, and spring means individually biasing said cam means into engagement with said maintaining means.

7. The combination defined in claim 6 wherein said cam means are slidably received in at least some grooves of one of said members.

8. The combination defined in claim 7 wherein said maintaining means is angularly and axially movable relative to said one member and rotatably mounted on said other member for axial movement unitarily therewith.

9. A constant velocity universal joint comprising in combination an outer member having an axial opening therein, an inner member received in said opening, said members having a plurality of groove means therein with the groove means in one of said members disposed in paired cooperating relationship with the groove means in said other member, a plurality of torque transmitting means with at least one disposed in each pair of cooperating groove means, and means for maintaining said plurality of torque transmitting means in uniplanar relationship and positioning the same in a plane bisecting the angle defined by said members, said maintaining and positioning means including a cage means rotatably mounted on one of said members for axial movement unitarily therewith and being axially and angularly movable relative to the other of said members, and spring means carried by said one member and operatively engaging said cage means for biasing said cage means to position said torque transmitting means in the bisecting plane, said spring means being unitarily movable with said one member upon relative axial movement between said members.

10. A constant velocity universal joint comprising in combination an outer member having an axial opening therein, an inner member received in said opening, said members each having at least three grooves therein disposed in a circumferentially balanced relationship with the grooves in one of said members disposed in paired cooperating relationship with the grooves in said other member, a plurality of driver balls with at least one disposed in each pair of cooperating grooves, a cage maintaining said drive balls in uniplanar relationship and being axially and angularly movable relative to one of said members and rotatably mounted on the other of said members for axial movement unitarily therewith, the surface of said cage and the surface of said other member being cooperating spherical surfaces, a plurality of pairs of cam means slidably received in said three grooves of said one member, each pair of said plurality of pairs of cam means being disposed in axial spaced relationship and engaging opposite axial sides of said cage means, spring means carried by said other member for independently biasing said cam means, said other member, said spring means, said cam means and said cage means being unitarily movable relative to said one member upon relative axial movement between said members.

11. A constant velocity universal joint comprising in combination an outer member having an axial opening therein, an inner member received in said opening, said members each having at least three grooves therein disposed in a circumferentially balanced relationship with the grooves in one of said members being disposed in paired cooperating relationship with the grooves in the other of said members, a plurality of driver balls with at least one disposed in each pair of cooperating grooves, a cage maintaining said driver balls in uniplanar relationship and being axially and angularly movable relative to one of said members and mounted for rotation and unitary axial movement on the other of said members, said cage and said other member having cooperating spherical surfaces, a plurality of pairs of cam means slidably received in said three grooves of said one member, each pair of said plurality of pairs of cam means being disposed in axial spaced relationship and engaging opposite axial sides of said cage means, and spring means carried by said one member for independently biasing said cam means into positionable engagement with said cage, whereby said driver balls are positioned in the plane bisecting the angle defined by said members.

References Cited in the file of this patent

UNITED STATES PATENTS

| | | |
|---|---|---|
| 2,150,942 | Rzeppa | Mar. 21, 1939 |
| 2,309,939 | Dodge | Feb. 2, 1943 |
| 2,313,279 | Suczek | Mar. 9, 1943 |
| 2,352,776 | Dodge | July 4, 1944 |
| 2,427,237 | Suczek | Sept. 9, 1947 |
| 2,862,373 | Bibson | Dec. 2, 1958 |